(12) United States Patent
Blevins et al.

(10) Patent No.: US 7,926,090 B2
(45) Date of Patent: Apr. 12, 2011

(54) SEPARATE SECURE NETWORKS OVER A NON-SECURE NETWORK

(75) Inventors: Edward J. Blevins, Austin, TX (US); John Arley Burns, Houston, TX (US); Dale S. Walker, Houston, TX (US); Ricky C. White, Salado, TX (US)

(73) Assignee: ERF Wireless, Inc., League City, TX (US)

( * ) Notice: Subject to any disclaimer, the term of this patent is extended or adjusted under 35 U.S.C. 154(b) by 940 days.

(21) Appl. No.: 11/777,704

(22) Filed: Jul. 13, 2007

(65) Prior Publication Data

US 2009/0016357 A1 Jan. 15, 2009

(51) Int. Cl.
G06F 21/22 (2006.01)
G06F 9/00 (2006.01)

(52) U.S. Cl. .................................. 726/4; 713/193; 726/1

(58) Field of Classification Search ........................ None
See application file for complete search history.

(56) References Cited

U.S. PATENT DOCUMENTS

| | | | |
|---|---|---|---|
| 6,175,917 B1 * | 1/2001 | Arrow et al. ........................ 713/1 |
| 7,290,060 B2 * | 10/2007 | Kong ............................ 709/245 |
| 7,346,670 B2 * | 3/2008 | Kitani et al. .................... 709/219 |
| 7,437,753 B2 * | 10/2008 | Nahum .............................. 726/4 |
| 7,818,790 B1 * | 10/2010 | Burns et al. ........................ 726/7 |
| 2005/0193103 A1 * | 9/2005 | Drabik ........................... 709/221 |
| 2008/0008125 A1 * | 1/2008 | Pham et al. ..................... 370/329 |
| 2008/0031130 A1 * | 2/2008 | Raj et al. ........................ 370/225 |
| 2009/0016357 A1 * | 1/2009 | Blevins et al. ............ 370/395.53 |
| 2010/0226280 A1 * | 9/2010 | Burns et al. .................... 370/254 |

* cited by examiner

Primary Examiner — Christopher A Revak
(74) Attorney, Agent, or Firm — Conley Rose, P.C.

(57) ABSTRACT

Systems and methods for creating and operating separate secure networks over a non-secure network are described herein. Some illustrative embodiments include a system that includes a router with one or more ports and control logic coupled to the one or more ports (the control logic capable of establishing a plurality of secure data paths with at least one other router across a network), and a plurality of external storage devices (each storage device separate from the router but capable of being detachably coupled to a port of the one or more ports, and each external storage device comprising configuration data defining one or more secure data paths of the plurality of secure data paths). Configuration data stored in a first external storage device of the plurality of external storage devices is different from configuration data stored in a second external storage device of the plurality of external storage devices.

20 Claims, 6 Drawing Sheets

Fig. 6

SEPARATE SECURE NETWORKS OVER A NON-SECURE NETWORK

RELATED APPLICATIONS

This application contains subject matter that may be related to U.S. Nonprovisional application Ser. No. 11/533,652, filed Sep. 20, 2006 and entitled "Router for Use in a Monitored Network," to U.S. Nonprovisional application Ser. No. 11/533,672, filed Sep. 20, 2006 and entitled "Monitoring Server For Monitoring A Network Of Routers," and to U.S. Nonprovisional application Ser. No. 11/689,712, filed Mar. 22, 2007 and entitled "Safeguarding Router Configuration Data," all of which are herein incorporated by reference.

BACKGROUND

Routers are electrical devices that are used to permit computers and networks of computers to pass data back and forth. A router typically has one or more input ports and one or more output ports. Data packets containing a destination address arrive on an input port. Based on the destination address, the router forwards the data packet to an appropriate output port which may be connected to the destination computer system or to another router. The data being transmitted between routers may be confidential (e.g., bank account data in the context of a bank's network) and thus the security of such data should be ensured. Accordingly, at least some routers provide encryption to allow secure communications across an untrusted communication channel, such as the Internet.

Additionally, some such routers provide additional security to protect the configuration of the routers themselves, but such configuration protection measures sometimes operate on the presumption that a person or group of persons authorized to configure the router is/are authorized to control all data traffic through the router. Thus, for security reasons such a router may only be used to route data to or from a limited number of destinations and sources that are all under the control of the authorized person or group. If additional data to or from other destinations and sources controlled by others is needed, additional routers must be added to such a network, thereby incurring a corresponding increase in installation and maintenance costs, as well as complexity.

SUMMARY

Systems and methods for creating and operating separate secure networks over a non-secure network are described herein. Some illustrative embodiments include a system that includes a router with one or more ports and control logic coupled to the one or more ports (the control logic capable of establishing a plurality of secure data paths with at least one other router across a network), and a plurality of external storage devices (each storage device separate from the router but capable of being detachably coupled to a port of the one or more ports, and each external storage device comprising configuration data defining one or more secure data paths of the plurality of secure data paths). Configuration data stored in a first external storage device of the plurality of external storage devices is different from configuration data stored in a second external storage device of the plurality of external storage devices.

Other illustrative embodiments include a method that includes defining two or more sets of configuration data (each of the two or more sets of configuration data comprising one or more attributes that define at least one secure data path between two routers across a network), storing a first set of configuration data on a first storage device of a plurality of storage devices that are each external and capable of being detachably coupled to the routers, and storing a second set of configuration data on a second storage device of the plurality of storage devices (the first set of configuration data being different from the second set of configuration data).

BRIEF DESCRIPTION

For a detailed description of the illustrative embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

Additionally, the term "system" refers to a collection of two or more hardware and/or software components, and may be used to refer to an electronic device, such as a computer, a network router, a portion of a computer or a network router, a combination of computers and/or network routers, etc. Further, the term "software" includes any executable code capable of running on a processor, regardless of the media used to store the software. Thus, code stored in non-volatile memory, and sometimes referred to as "embedded firmware," is included within the definition of software. Also, the term "secure," within the context of secure data, indicates that data has been protected so that access by unauthorized personnel is either prevented, or made sufficiently difficult such that breaching the protection measures is rendered impractical or prohibitively expensive relative to the value of the data.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Routers are sometimes used as transfer points between secured and unsecured networks. When so utilized, the routers may be configured to protect data originating from, or destined to, a secure network and/or device. Such protection may include encryption of the data prior to transmission across an unsecured network (e.g., IPSec, RSA Public/Private Key Encryption, and Virtual Private Networks) as well as secure and/or encrypted authentication of a router on one end of the transaction by the router at the other end of the transaction (e.g., digital signatures). Because the configuration of these routers is a key element to ensuring data security, it is important to secure and control access to the configuration data of such routers. Further, when data is provided to and from different destinations and sources, or when the data is categorized at differing security levels or is under the control of different groups or organizations, it may be necessary to provide separate configuration control of a router based on the source, the destination, the security level of the data, and/or the group or organization responsible for security of the data.

Figure 1:
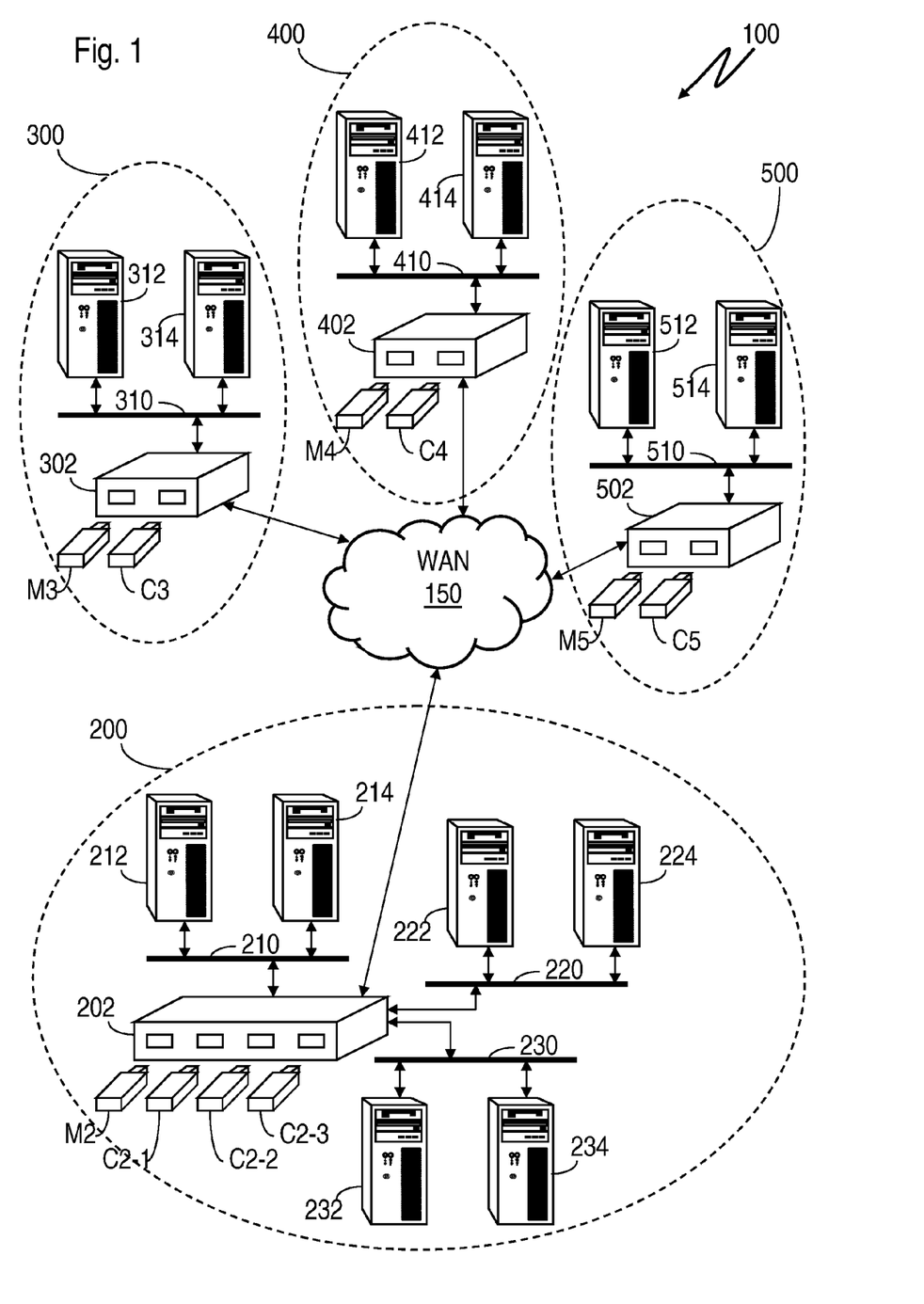
FIG. 1 shows a network routing system utilizing a router constructed in accordance with at least some illustrative embodiments.

FIG. 1 shows a networked system 100 that incorporates a router 202, constructed in accordance with at least some illustrative embodiments, that provides the distributed configuration control described above. Although the illustrative embodiment show and described includes a network router, other illustrative embodiments may include different or additional devices, such as network switches and/or hubs, and all such devices are within the scope of the present disclosure. Four sub-networks (200, 300, 400 and 500) are shown that couple to each other via wide area network (WAN) 150. Each sub-network comprises a router (202, 302, 402 and 502 respectively) that provides connectivity between WAN 150 and one or more local area networks (LANs) coupled to each router. The LANs within each sub-network (LANs 210, 220, 230, 310, 410 and 510) couple one or more computer systems (212, 214, 222, 224, 232, 234, 312, 314, 412, 414, 512 and 514) to the router corresponding to a given sub-network, thus providing each computer system on each LAN connectivity to WAN 150 and to each of the other computer systems on each LAN.

Each router isolates the LANs to which the router couples from WAN 150 and other LANs by controlling and verifying where data is allowed to be sent and received, and by encrypting data before it is transmitted across WAN 150. For example, if a user wishes to transmit secure data from computer system 212 on LAN 202 to computer system 514 on LAN 502, router 202 is configured to allow the specific type and security level of data to be transmitted from computer system 212 to computer system 514 by the user attempting to send the data. Router 202 establishes a connection with router 502 and sets up a "tunnel" or secure data path through WAN 150 wherein the contents of the packets, including the network protocol headers of the messages as received from the respective LANs, are encrypted and encapsulated according to the networking protocol of WAN 150 (e.g., TCP/IP and IPsec). In this manner the data being transmitted (and its LAN headers) appears in clear text form only on the source and destination LANs, and is otherwise visible on all other intervening networks only in encrypted form.

The security of the "tunneled" data (encrypted, encapsulated and transmitted across WAN 150) depends significantly on the security of the configuration of each of the routers. In at least some illustrative embodiments, each router of FIG. 1 protects its configuration through the use of an external, detachable maintenance device (M2, M3, M4 and M5), and one or more external, detachable configuration devices (C2-1, C2-2, C2-3, C3, C4 and C5), each of which is under the control of a separate user. Each separate user and each external device must be authenticated by the router to which the devices couple before the configuration of the router can be loaded and/or modified. In at least some illustrative embodiments, the devices are non-volatile storage devices that couple to the routers via Universal Serial Bus (USB) style connectors.

As can be seen in the illustrative embodiment of FIG. 1, routers 302, 402 and 502 each utilize a single maintenance device (M3, M4 and M5) and a single configuration device (C3, C4 and C5) to configure each router. Each device is under the control of separate individuals or organizations, and each device as well as each user of each device must be authenticated by the router. As a result, in at least some illustrative embodiments a minimum of two individual users are required to alter the configuration of a router. Additional individuals or organizations may be assigned physical control of each configuration device (i.e., custodians of the devices), further enhancing security and discouraging collusion among malicious users. Upon initialization or reconfiguration of the router, each device coupled to the router is authenticated by decrypting encrypted identification data stored on the device, using an embedded decryption key stored within the router. Each user of each device is authenticated by comparing authentication data provided by a user against reference authentication data stored either within the router or within the device presented by the user. The authentication data may be provided by the user in the form of a user ID and password entered via a keyboard and/or mouse coupled to the router, or in the form of biometric data, such as a fingerprint provided via an appropriate scanning device coupled to the router. Other mechanisms for providing user authentication data will become apparent those of ordinary skill in the art, and all such mechanisms are within the scope of the present disclosure.

Continuing to refer to FIG. 1, router 202 utilizes maintenance and configuration devices similar to those used by the other routers, but is capable of accepting multiple configuration devices. Each configuration device (C2-1, C2-2 and C2-3) is capable of configuring router 202 to route data and to connect to source and destination computer systems under the control of specific individuals and/or organizations, each of which control access to each configuration device, and each of which must provide separate authentication data for their corresponding device. By providing separate configuration data, router 202 may be configured to provide multiple secure data paths, each under the configuration control of a separate individual and/or organization. Thus, for example, router 202 can establish a first tunnel between router 202 and router 502 to route data securely from computer system 212 to computer system 512. While the first tunnel is operative, router 202 can establish a second, separate tunnel between router 202 and router 302 to route data from computer system 224 to computer system 312. Those of ordinary skill in the art will recognize that any number of such tunnels can be established by router 202.

The configuration allowing the first tunnel to be setup and used is controlled by a first authorized user (e.g., a financial officer of a first bank) and used to route one type of data (e.g., confidential financial data), while the configuration allowing the second tunnel to be setup and used is controlled by a second authorized user (e.g., a network engineer) and used to route the same or different type of data (e.g., network monitoring data). Each tunnel is allowed and setup based upon configuration data provided by a corresponding configuration device, presented to the router in conjunction with the maintenance device, and loaded into volatile storage within the router as part of the routers configuration. Thus, for example, configuration device C2-1 provides the configuration data and/or at least some of the authentication data related to routing data from computer system 212 to computer system 512 via one tunnel, while configuration devices C2-3 provides the configuration and/or authentication data related to routing data from computer system 224 to computer system 312 via another tunnel.

Although the example described above divides the configuration stored in each configuration device based upon destination address of the computer systems and/or networks, other divisions are possible. Tunnels may be established based upon the type of data being (e.g., financial data, network monitoring data, and camera and alarm data), and/or based upon who controls access to the data (e.g., a bank official, a security officer, or network maintenance personnel). For example, data provided by computer system 212 may include financial data from one bank that is being sent to computer system 414 at another bank. At the same time, the first bank may also provide video surveillance data from its security computer system to local police departments on an "as needed" basis if an alarm is detected.

But banking regulations generally do not allow any external, non-banking entities, such as a police department, to connect directly to a bank's network 210, due to the presence of confidential banking data on network 210. Router 202 provides a separate, secure tunnel through which only the video surveillance data is routed to such an external entity without giving the entity direct access to network 210, and without compromising confidential banking data. The tunnel is encrypted using different keys than the banking data, and is routed to a computer system operated by the police department (e.g., computer system 514) based upon rules that allow only this type of data to be routed to the police department's computer system. These rules are stored on a separate configuration device, under the control of a person authorized to configure the routing of the video surveillance data, but not the financial data. As a result, the police department does not gain access to the banking data, the decryption keys used to decrypt the video surveillance data cannot be used to decrypt the banking data even if the police department did gain access to the financial data, and the person authorized to use the configuration device cannot alter the configuration of router 202 to gain access or decrypt banking data present on network 210.

Figure 2:
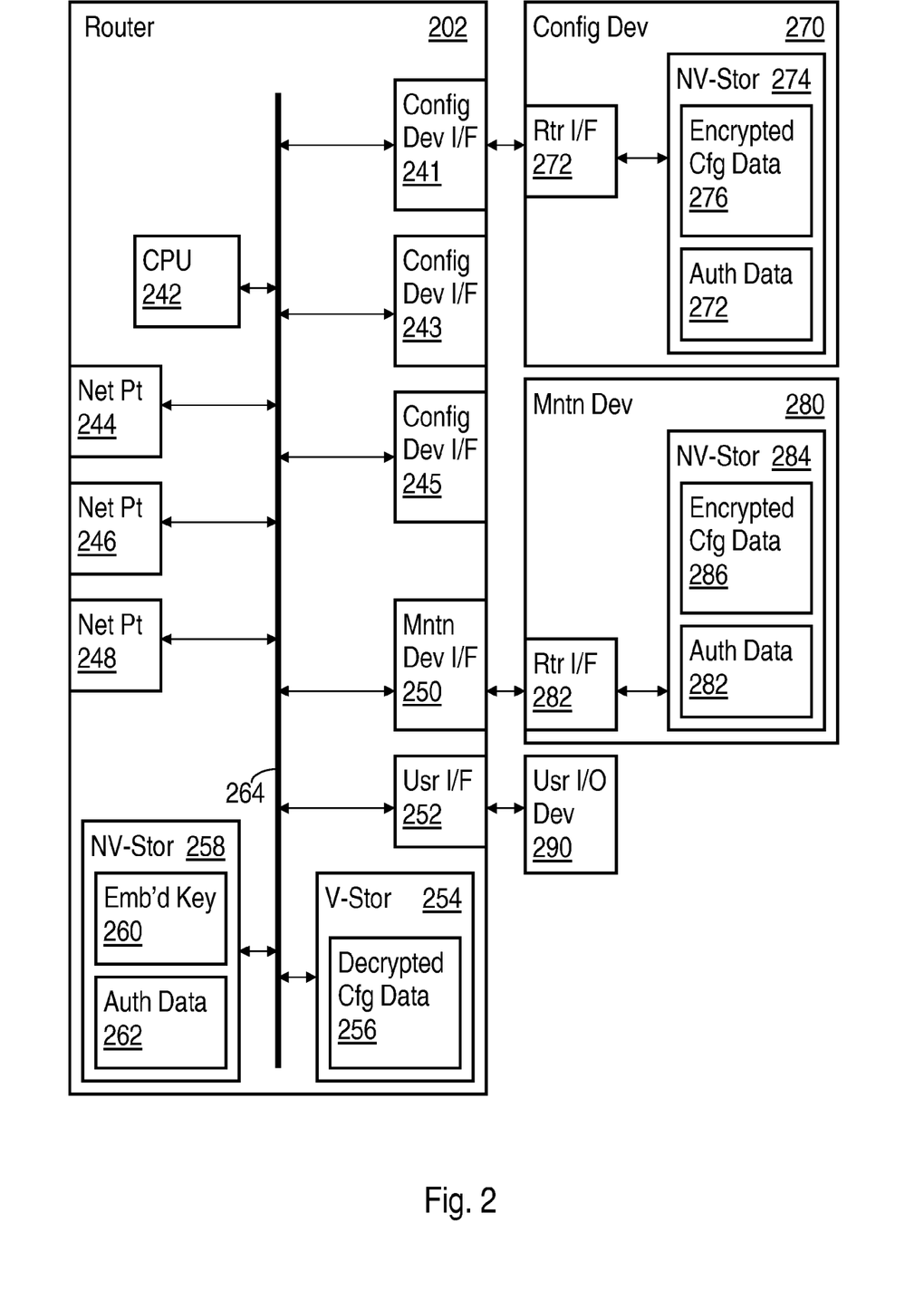
FIG. 2 shows a configuration device and a maintenance device, both coupled to a router constructed in accordance with at least some illustrative embodiments.

FIG. 2 shows a block diagram that details a router 202, constructed in accordance with at least some illustrative embodiments, and further details a configuration device 270 and a maintenance device 280, both coupled to router 202. Router 202 includes central processing unit (CPU) 242, network ports (Net Pts) 244, 246 and 248, configuration device interfaces (Config Dev I/Fs) 241, 243 and 245, maintenance device interface (Mntn I/F) 250, user interface (Usr I/F) 252, volatile storage (V-Stor) 254, and non-volatile storage (NV-Stor) 258, each of which couple to a common bus 264. CPU 242 controls the routing of data between network ports 244, 246 and 248, based on decrypted configuration data (Decrypted Cfg Data) 256 stored within volatile storage 254. The configuration data is stored in encrypted form within configuration device (Config Dev) 270, which detachably couples to router 202 via configuration device interface 241. Configuration device 270 includes router interface (Rtr I/F) 272 and non-volatile storage 274, each coupled to the other. Non-volatile storage 274 stores encrypted configuration data (Encrypted Cfg Data) 276, which is retrieved by CPU 242 of router 202 while configuration device 270 is coupled to configuration device interface 241. CPU 242 uses embedded key (Emb'd Key) 260, stored within non-volatile storage 258, to decrypt the encrypted configuration data 276 to produce at least some of decrypted configuration data 256.

Maintenance device 280 includes router interface (Rtr I/F) 282 and non-volatile storage 284, each coupled to the other. Non-volatile storage 284 stores additional encrypted configuration data (Encrypted Cfg Data) 286, which is retrieved by CPU 242 of router 202 while maintenance device 280 is coupled to maintenance device interface 250. CPU 242 uses embedded key (Emb'd Key) 260, stored within non-volatile storage 258, to decrypt the additional encrypted configuration data 286 to optionally produce at least some of decrypted configuration data 256. Maintenance device 280 is not required for normal operation of the router ("normal mode"), but is instead used to place the router into a "maintenance mode," wherein authorized maintenance personnel can perform scheduled maintenance of the router, and/or troubleshoot problems with the router and network.

Access to the embedded key 260, and thus to the configuration data required to operate the router 202 may be controlled through the use of user-provided authentication data. In at least some illustrative embodiments, the authentication data is provided by a user operating user input/output device (Usr I/O Dev) 290, which is coupled to user interface 252. The input provided by the user may be in the form of a password, or in the form of biometric data (e.g., scanned fingerprint or retina data). The authentication data may then be compared to stored and/or encrypted reference copies of the authentication data, which may be stored locally within router 202 in non-volatile storage 258 (Auth Data 262), externally in non-volatile storage 274 within configuration device 270 (Auth Data 272), and/or externally in non-volatile storage 284 within maintenance device 280 (Auth Data 282).

It should be noted that although the illustrative embodiment of FIG. 2 does not show additional configuration devices coupled to configuration device interfaces 243 and 245, any number of configuration devices, up to the number of available configuration device interfaces, may be coupled to router 202. Decrypted configuration data 256, stored in non-volatile storage 254, results from decrypting and combining the encrypted configuration data stored in each configuration device (and optionally the maintenance device) coupled to router 202. Other illustrative embodiments may include any number of configuration device interfaces. Also, software executing on CPU 242 may allow multiple configuration devices to be sequentially plugged into, authenticated, and unplugged from a single configuration device interface, extending the number of configuration devices that may be used to configure the router beyond the number of available configuration device interface. Other techniques and configurations for increasing the number of configuration devices that may be used to configure router 202 will become apparent to those of ordinary skill in the art, and all such techniques and configurations are within the scope of the present disclosure.

Figure 3:
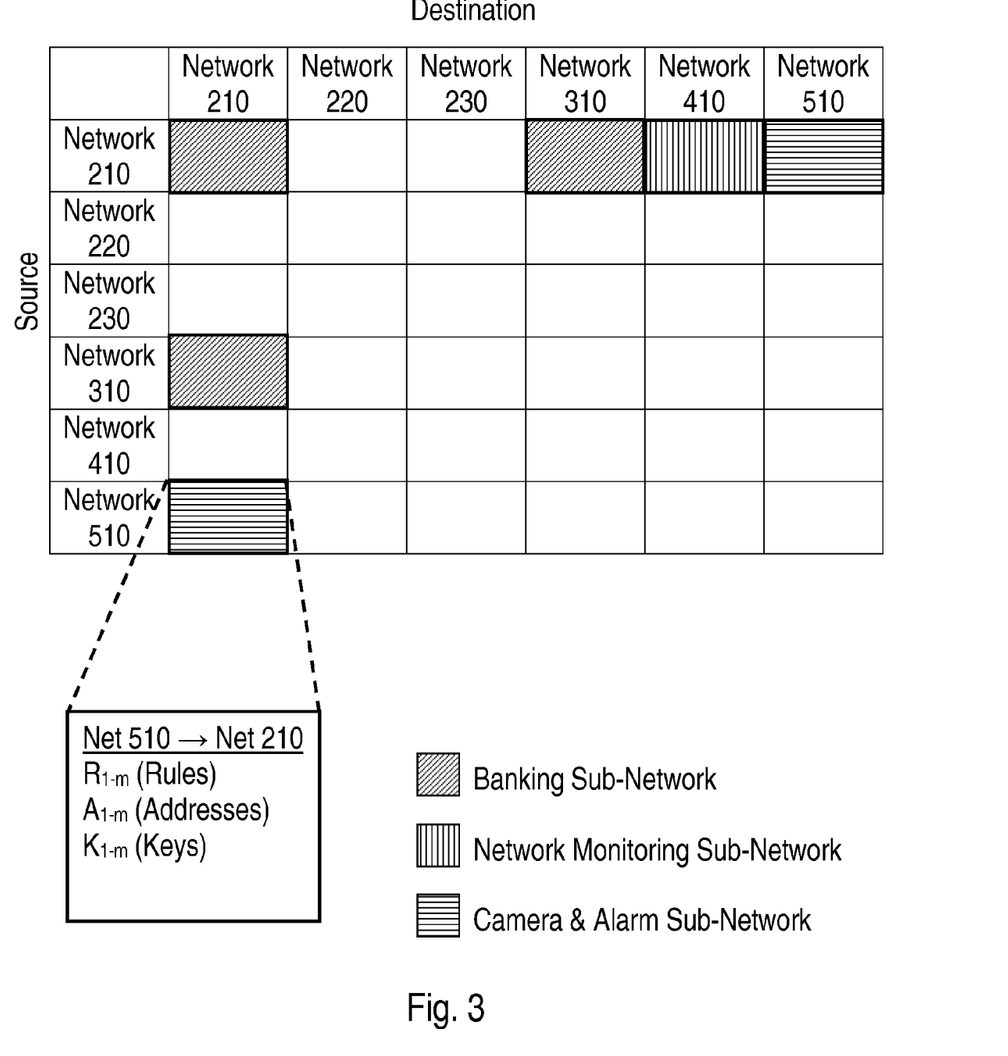
FIG. 3 shows a routing matrix table, in accordance with at least some illustrative embodiments.

As already noted, the configuration data stored within configuration device controls how and where data is routed. FIG. 3 shows a routing matrix table that defines valid routes to and from each of the LANs (210, 220, 230, 310, 410 and 510) within the networked system 100 of FIG. 1, as well as how data routing configurations may be grouped for storage within a configuration device, in accordance with at least some illustrative embodiments. The routing matrix table is stored in non-volatile storage device 254 as part of decrypted configuration data 256 (FIG. 1). The routing matrix table shown in FIG. 3 lists the available LANs of FIG. 1 (210, 220, 230, 310, 410 and 510) coupled to each of the routers as both possible sources (rows) and destinations (columns). Each row/column intersection represents a table entry, and each active table entry includes one or more attributes that define a secure path, such as: a list of rules $R_{1-m}$ (where m is the number of rules) that govern the types of packets that are allowed to be transmitted from the source to the destination; a list of allowable destination addresses $A_{1-n}$ within the network address space of the destination LAN (where n is the number of legal destination addresses within the address space); and a list of encryption/decryption keys $K_{1-n}$, each key corresponding to an address of the allowable destination addresses $A_{1-n}$. Each of the encryption/decryption keys $K_{1-n}$ may be used to encrypt and/or decrypt routed data, or may be used to encrypt messages used to exchange session keys, which are in turn used to encrypt and/or decrypt routed data. By default a table entry that is not active does not allow any connections or data transfers from the source to the destination corresponding to the table entry (indicated by a blank table entry in FIG. 3).

Although it is possible to configure a single configuration device for each combination of individual sources and destinations (i.e., for each entry in the table of FIG. 3), in at least some illustrative embodiments several table entries are combined into a single configuration device and are controlled by a single individual and/or organization. Several such groupings are defined and are each stored in separate configuration devices. FIG. 3 shows an example of such grouped configurations. Referring to both FIG. 1 and FIG. 3, Router 202 is configured to route banking between LAN 210 and LAN 310 (both to and from both networks), and to and from LAN 210 in a loopback configuration. Router 202 is further configured to route network monitoring data from LAN 210 to LAN 410 (e.g., health and status data of radios used within LAN 210), and also to route camera and alarm data between LAN 210 and LAN 510. These combinations of sources and destinations are collected into a one of several groups, each group shown by a different cross-hatched pattern within the table of FIG. 3.

Figure 4:
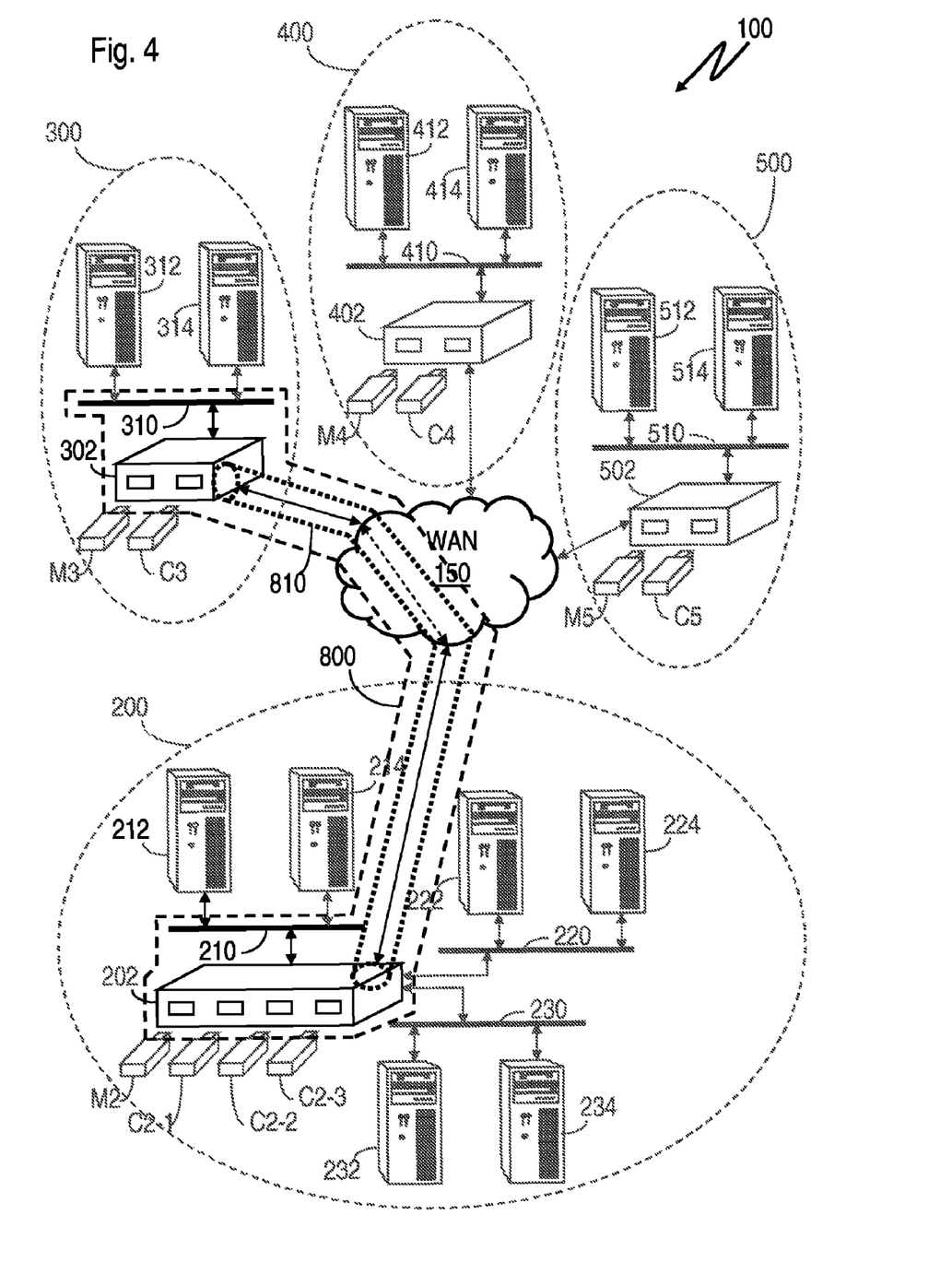
FIG. 4 shows the creation of a sub-network by a router constructed in accordance with at least some illustrative embodiments.

Each group is stored within a single configuration device under the control of a single individual and/or organization. Using a bank as an example, LANs 210, 220 and 230 are part of the bank's financial data network, radio monitoring network, and camera and alarm networks respectively. Referring to the table in FIG. 3, the first configuration device includes the configuration that defines the financial data sub-network and is controlled by the bank's financial officer. The second configuration device includes the configuration that defines the radio monitoring sub-network and is controlled by the bank's information technology (IT) department. The third configuration device includes the configuration that defines the camera and alarm sub-network and is controlled by bank security personnel. Each of the defined sub-networks include the physical source and destination LANS, as well as the tunnels across WAN 150 created by the routers. Thus, as shown, for example, in FIG. 4, the financial data sub-network 800 includes LANs 210 and 310, routers 202 and 302, and tunnel 810 created between routers 202 and 302 across WAN 150.

Figure 5:
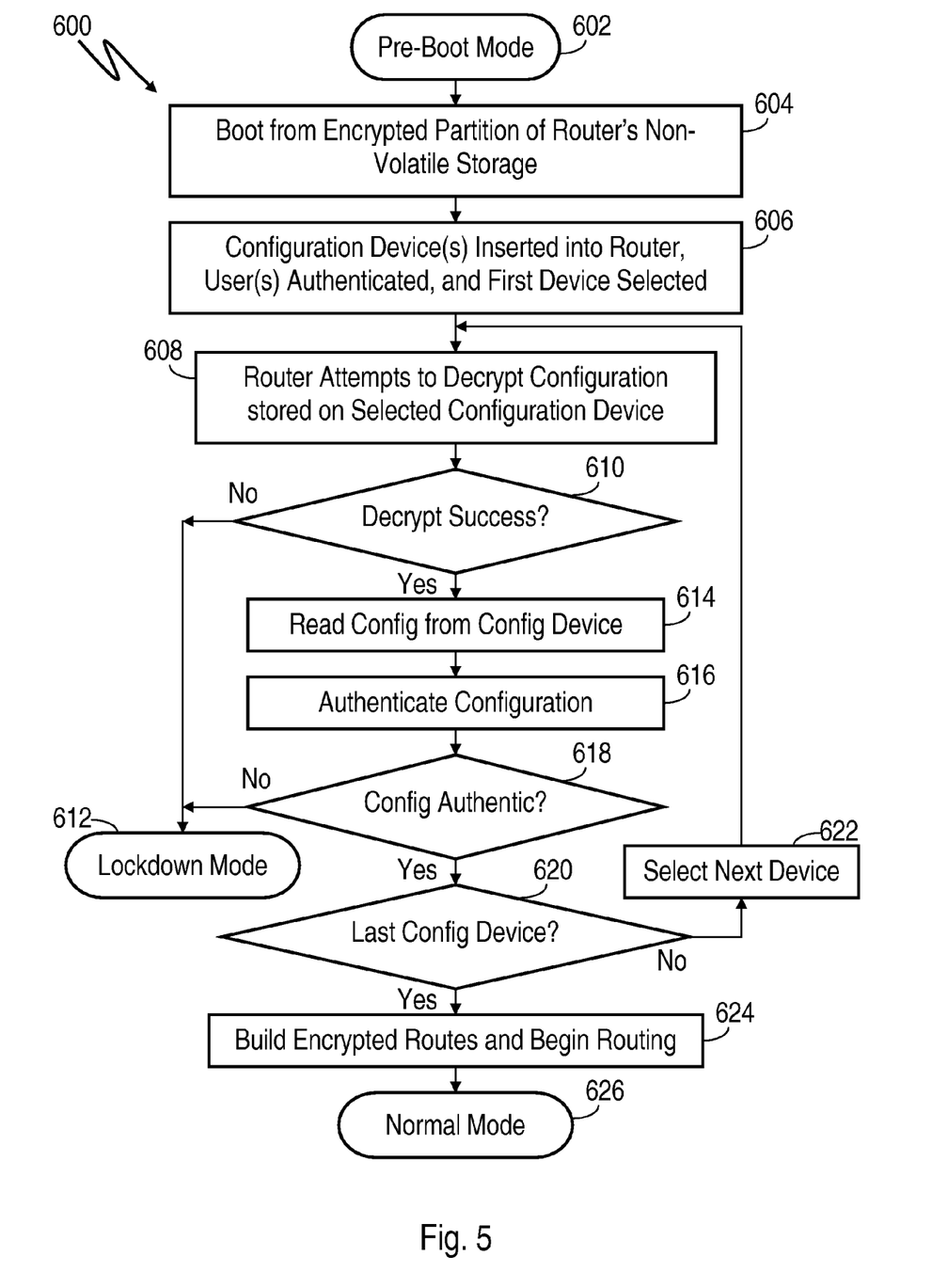
FIG. 5 shows a method for configuring a router at boot-up, in accordance with at least some illustrative embodiments.

As previously described, the router configuration is loaded into volatile memory from one or configuration devices upon initialization or reconfiguration of the router. FIG. 5 illustrates a method 600 for loading the configuration data from one or more configuration devices, in accordance with at least some illustrative embodiments. Referring to both FIGS. 2 and 5, at block 602, the router is in a pre-boot mode (e.g., an off state). At block 604, the router boots up from an encrypted partition on the routers non-volatile storage 258 decrypted using embedded key 260. Then, at block 606, the user inserts (perhaps at the request of a prompt on user I/O device 290) at least one configuration device (e.g., configuration device 270) into a connector coupling the configuration device to one of the configuration device interfaces (e.g., configuration device 241). The user of the configuration device may be verified in a suitable process such as through biometric verification as previously described. The process then continues by decrypting the configuration data contained on the configuration device 270 (block 606). This router's CPU 242 uses the embedded key 258 to attempt the decryption of block 608.

If this decryption fails (as determined at block 610), the key does not match the router or has been improperly altered. In such a situation, the router enters lockdown mode 612. If, however, the decryption succeeds at block 610, the router's CPU 242 reads the configuration data from the configuration device (e.g., rules $R_{1-m}$, legal destination addresses $A_{1-n}$ and encryption/decryption keys $K_{1-n}$). The router then, at block 616, authenticates the configuration data (e.g., by computing a checksum using at least some of the stored and decrypted data and comparing the computed checksum to a reference checksum). If the configuration data fails to authenticate (block 618), then the router is transitioned to the lockdown mode 612. If, however, the authentication succeeds (block 612), then a check is performed to determine if there are additional configuration devices. This check may be performed by detecting if additional configuration devices have been inserted and coupled to the router, or by prompting a user to indicate if additional configuration devices are going to be coupled.

If there are more configuration devices with configuration data to be loaded (block 620), the next configuration device is selected at block 622 (e.g., by selecting a configuration device coupled to a configuration device interface not yet accessed), and the process for decrypting, reading and authenticating the configuration data is repeated (blocks 610-618). Once the last configuration device is successfully processed, then at block 624, the router builds encrypted routes (e.g., tunnels) and begins routing packets. At that point, the router is now in the normal mode 626 of operation. Entry into the normal mode 626 also requires removal of the configuration device 270 in accordance with at least some embodiments. This security feature prevents tampering with the configuration device 270 during normal operation.

As explained above, a router attempts to decrypt the encrypted configuration data contained on the configuration device 270 coupled to that router during the boot process. The configuration data was previously encrypted using the embedded key 260 and thus can be correctly decrypted with, and only with, the same embedded key. If the configuration device 270 is coupled to a router that did not provide the embedded key used to encrypt the configuration device's data in the first place, then the decryption process during boot-up of the router will not be successful, and the router enters the lockdown mode as explained above.

Changes to the router's configuration are made in a "maintenance" mode. The maintenance mode preferably cannot be entered without a legitimate configuration device 270 and maintenance device 280 coupled to the router 202. The maintenance device 280 contains a key that has been encrypted using the router's embedded key 260. Upon coupling the maintenance key 280 to the router's maintenance device interface 250, the router's CPU 242 authenticates the user of the maintenance device (e.g., via biometrics as explained above) and also decrypts the encrypted key on the maintenance key using the router's embedded key 260. Any attempt to insert a compromised maintenance device 280 will fail upon decryption and cause the router 202 to enter the lockdown mode.

Figure 6:
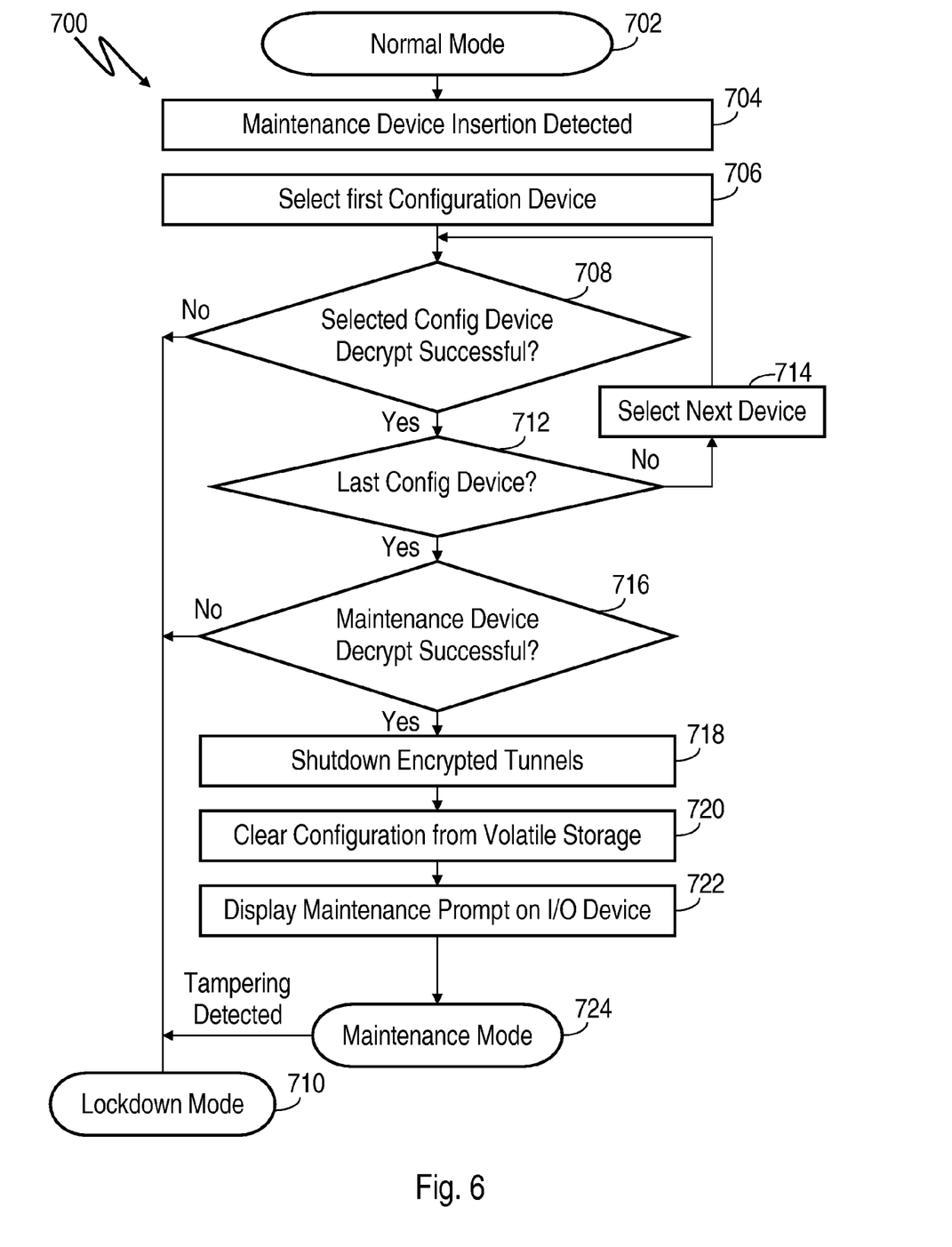
FIG. 6 shows a method for transitioning a router from a normal operational mode to a maintenance mode, in accordance with at least some illustrative embodiments.

FIG. 6 shows an illustrative method 700 for transitioning from the normal mode to the maintenance mode. In at least some illustrative embodiments, all configuration data is present on one or more configuration devices (e.g., configuration device 270), not in permanent storage on the routers non-volatile storage 258. Thus, in such embodiments to perform maintenance on the router 202, both devices 270 and 280 must be coupled to the router and the users' validated (e.g., biometric verification). At block 702, the router is in the normal mode. A user authorized to perform maintenance on the router inserts his or her maintenance device 280 into a port, coupling the device to the maintenance device interface 250 of router 202. The insertion of the maintenance device 280 is detected at block 704 of method 700. At block 706, a first configuration device is selected (e.g., any one of three configuration devices coupled to router 202). At block 708, the data contents of the configuration device 160 are decrypted (i.e., validated). This action is performed by the routers CPU 242 which attempts to decrypt the contents of the selected configuration device (e.g., configuration device 270) using the embedded key 260. If the selected configuration device is not successfully decrypted, the router enters the lockdown mode 710. If the selected configuration device is successfully decrypted, a check is preformed to determine if there are other configuration devices that also need to be decrypted (block 712). If there are additional configuration devices with configuration data to be decrypted, the next configuration device (i.e., a configuration device with configuration data not yet decrypted) is selected, and the process to decrypt configuration data (block 708) is repeated. After the configuration data of all configuration devices has been successfully decrypted, at block 716, the maintenance device 280 is also similarly decrypted (validated). If the maintenance device 280 is not successfully decrypted, the router enters the lockdown mode 710.

If all of the configuration devices and the maintenance device are successfully decrypted, which requires all users of the each of the devices to physically be present at the router, control passes to block 718, where the communication tunnels of the router being maintained are shutdown thereby precluding further communications to/from that router. At block 720, the routers volatile storage 254, or at least any configuration data in such volatile storage, is erased thereby reducing the potential for such data falling into the hands of a malicious user. At block 722, information such as menu options pertaining to the maintenance mode are shown on user I/O device 290. At block 724, the router is now in the maintenance mode. Any one or more of a variety of maintenance actions can now be performed on the router 202. Any attempt to tamper with the router 202 will result in the router being transitioned to the lockdown mode 710.

The above disclosure is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a router comprising one or more ports and control logic coupled to the one or more ports, the control logic capable of establishing a plurality of secure data paths with at least one other router across a network; and
   a plurality of external storage devices, each storage device separate from the router but capable of being detachably coupled to a port of the one or more ports, and each external storage device comprising configuration data defining one or more secure data paths of the plurality of secure data paths;
   wherein configuration data stored in a first external storage device of the plurality of external storage devices is different from configuration data stored in a second external storage device of the plurality of external storage devices.

2. The system of claim 1, wherein data transmitted across a first secure data path defined by the configuration data stored in the first external storage device cannot be accessed via a second secure data path defined by the configuration data stored in the second external storage device.

3. The system of claim 1, wherein configuration data defining two or more of the plurality of secure data paths are grouped and stored together in a single external storage device.

4. The system of claim 3, wherein configuration data defining two or more of the plurality of secure data paths are grouped based upon a common characteristic, the common characteristic comprising at least one common characteristic selected from the group consisting of a common data type, a common authorized user, and a common network address.

5. The system of claim 1, wherein the configuration data defining the one or more secure data paths comprises a list of rules associated with a secure data path of the plurality of data paths controlling the types of data transmitted across the secure data path.

6. The system of claim 1, wherein the configuration data defining the one or more secure data paths comprises a list of allowable destination addresses within a network address space, the list associated with a secure data path of the plurality of secure data paths.

7. The system of claim 6, wherein the configuration data defining the one or more secure data paths further comprises a list of encryption keys, each encryption key corresponding to an allowable destination address from the list of allowable destination addresses, and each encryption key used to encrypt data transmitted to the allowable destination address.

8. The system of claim 1, further comprising a non-volatile storage device comprising a decryption key, wherein the configuration data defining the one or more secure data paths is stored in encrypted form in each of the plurality of external storage devices, and wherein the decryption key is used by the control logic to decrypt the configuration data.

9. The system of claim 1, wherein the router uses the configuration data defining the one or more secure data paths to configure the router after each user authorized to access an external storage device of the plurality of external storage devices provides user authorization data that is verified by the control logic.

10. The system of claim 9, wherein the user authorization data comprises a user ID and a password.

11. The system of claim 9, wherein the user authorization data comprises biometric data.

12. The system of claim 9, wherein the user authorization data is verified by comparing the user authorization data to a reference copy of the user authorization data stored in encrypted form and decrypted using a decryption key stored in a non-volatile storage device within the router.

13. The system of claim 12, wherein the reference copy of the user authorization data is stored in the non-volatile storage device within the router.

14. The system of claim 12, wherein the reference copy of the user authorization data is stored in the external storage device.

15. A method, comprising:
    defining two or more sets of configuration data, each of the two or more sets of configuration data comprising one or more attributes that define at least one secure data path between two routers across a network;
    storing a first set of configuration data in a first storage device of a plurality of storage devices that are each external and capable of being detachably coupled to the routers; and
    storing a second set of configuration data in a second storage device of the plurality of storage devices, the first set of configuration data being different from the second set of configuration data.

16. The method of claim 15, further comprising transmitting data across a first secure data path defined by the first set of configuration data, wherein the data cannot be accessed via a second secure data path defined by the second set of configuration data.

17. The method of claim 15, further comprising:
    coupling the plurality of storage devices to a first router;
    decrypting and loading onto the first router the two or more sets of configuration data; and
    authenticating each of the plurality of storage devices and each of a plurality of users, each user associated with one of the plurality of storage devices.

18. The method of claim 17, further comprising:
    placing the first router into a lockdown mode if the authenticating of any of the plurality of storage devices or of any of the plurality of users fails; and
    establishing the at least one secure data path between the first router and a second router based upon at least one of the two or more sets of configuration data if the authenticating of each of the plurality of storage devices and of each of the plurality of users is successful.

19. The method of claim 17, further comprising:
    placing the first router into a lockdown mode if the decrypting of the configuration data fails; and
    establishing the at least one secure data path between the first router and a second router based upon at least one of the two or more sets of configuration data if the decrypting of the configuration data is successful.

20. The method of claim 15, further comprising assigning physical control of each of the plurality of storage devices to different custodians.

\* \* \* \* \*